United States Patent [19]

Wetterhorn

[11] 4,240,298
[45] Dec. 23, 1980

[54] MOTION AMPLIFIER FOR CONDITION RESPONSIVE GAUGE INSTRUMENT

[75] Inventor: Richard H. Wetterhorn, Fairfield, Conn.

[73] Assignee: Dresser Industries, Inc., Dallas, Tex.

[21] Appl. No.: 859,514

[22] Filed: Dec. 12, 1977

Related U.S. Application Data

[63] Continuation of Ser. No. 708,470, Jul. 26, 1976, abandoned, which is a continuation of Ser. No. 413,483, Nov. 7, 1973, abandoned, which is a continuation-in-part of Ser. No. 186,120, Oct. 4, 1971, abandoned.

[51] Int. Cl.² ............................................. G01L 7/04
[52] U.S. Cl. ...................................... 73/732; 73/740; 73/741
[58] Field of Search ................. 73/732, 741, 733, 734, 73/735, 736, 737, 738, 739, 740, 742, 743

[56] References Cited

U.S. PATENT DOCUMENTS

| | | | |
|---|---|---|---|
| 1,835,561 | 12/1931 | Eshbaugh | 73/732 |
| 2,297,679 | 10/1942 | Allen | 73/715 |

*Primary Examiner*—Donald O. Woodiel
*Attorney, Agent, or Firm*—Daniel Rubin

[57] ABSTRACT

Amplifier apparatus for providing output motion correlated to condition change motion or deflection of a condition responsive element. The amplifier in a preferred embodiment is mounted onto the condition responsive element for floating conjoint movement therewith. A remotely connected actuator, extending into the motion path, defines a pivot axis for a hinged gear sector arm of the amplifier. In pivoting about the actuator axis, the sector arm operably drives a rotatable output shaft supporting a pointer or the like.

54 Claims, 24 Drawing Figures

MOTION AMPLIFIER FOR CONDITION RESPONSIVE GAUGE INSTRUMENT

This is a continuation of application Ser. No. 708,470, filed July 26, 1976, now abandoned, which is a continuation of Ser. No. 413,483, filed Nov. 7, 1973, abandoned which is a continuation-in-part of Ser. No. 186,120, filed Oct. 4, 1971, abandoned.

BACKGROUND OF THE INVENTION

1. The field of art to which the invention pertains includes the art of measuring and testing as applicable to amplifier movements for gauge instruments.

2. Amplifier movements for use with pressure gauges, temperature gauges or the like are well known and have been used commercially for many years. Typically, such gauges have a condition responsive element such as a bellows, bourdon tube, bi-metal coil or the like providing a displacement in response to condition changes to which the element is sensitive. In a common construction, the amplifier or "movement" is comprised of leverage and gearing operably responsive to arcuate deflective motion of the element for driving an output shaft supporting a pointer movable relative to a fixed dial plate. The dial registration opposite the pointer position is indicative of the condition state such as pressure or temperature with which the instrument is being operative.

Traditionally, such prior amplifiers or movements include various elements of sturdy construction which are fixed or anchored relative to the motion path of the element. It is usual for the pointer shaft and one or more of the intermediate components to be operated about such an axis. Performance of those gauge constructions are capable of providing high levels of readout accuracy and have therefore been generally regarded as satisfactory. Notwithstanding their general acceptability, they are marketed on a highly competitive basis such that their manufacturing costs largely dictate ultimate consumer price and consequent profit.

Contributing significantly toward those costs are several factors not least of which is the construction mass per se of the components associated with the prior art type stationary movements requiring fixed posts, plates or the like to which the anchored axes components can be secured. In addition, such units are characteristically regarded as complex and difficult to calibrate because of the different adjustment settings, each of which mutually affect each other. It is not unknown for many man hours to be consumed in obtaining final calibration in order to meet the expected operating standards of the instrument. Yet another high cost factor has been the need for a relatively expensive hair spring or the like employed to minimize or overcome slack between components that might otherwise arise to adversely affect operation and accuracy. Moreover, by virtue of their constructions, it has been impractical if not impossible to obtain effective temperature compensation for maintaining instrument accuracy throughout wide temperature ranges to which it is subjected. The latter is generally attributable to ultilization of a temperature sensitive link as part of the movement located within the case concealed or otherwise unresponsive to environmental changes occurring elsewhere. Despite recognition of these inherent drawbacks, the prior stationary type movements have continued heretofore to be employed as the industry standard for lack of a suitable alternative. Exemplifying movements of the prior art are those disclosed in U.S. Pat. Nos. 3,214,979; 1,658,840 and 1,584,742.

SUMMARY

This invention relates to novel apparatus for amplifying motion of a condition responsive element to drive an output shaft supporting indicia mechanism such as a pointer. More specifically, the invention relates to such an amplifier apparatus or movement of comparatively lower construction cost than similar purpose movements of the prior art. In a preferred embodiment, the operating components including the pointer shaft are mounted directly onto the displacing free end of the condition responsive element for conjoint floating movement therewith. By virtue of this construction the previously required extra mass and attendant expense is substantially if not completely eliminated. At the same time calibration, as compared to previous techniques, is substantially simplified since each adjustment setting can be independently rendered without affecting the others. Moreover, the arrangement of components places them in a weighted relation to each other enabling elimination of the formerly required slack removing hair spring. Where temperature compensation is desired, the construction lends itself to increasingly effective sensitivity by means of a compensating element operably positioned with thermal contact both inside and outside of the casing as to substantially enhance the operable reliability of such compensation.

In accordance with the invention, the amplifier hereof is comprised of a one piece low cost support frame which can attach directly to the free end of a motion producing condition responsive element with which it is to be used, e.g., a Bourdon tube which operates arcuately. A geared sector arm is hinge connected to the frame while a remotely supported but stationary actuator link intersects the arm at a predetermined location displaced from its hinge to define a pivot axis therefor. The geared end of the sector arm meshes with a pinion on a rotatable pointer shaft also supported on the frame at a location substantially coincident with the axial center of the gauge dial. In response to condition changes, induced displacement or motion of the condition responsive element results in a like motion to the amplifier moving it rotationally about the element's natural pivot point. The latter movement causes pivoting of the sector arm about the actuator axis culative to the remaining components to in turn rotatably drive the pointer shaft an amount correlated to the displaced motion of the element.

It is therefore an object of the invention to provide novel amplifier apparatus for transmitting motion of a condition responsive element to an output drive shaft.

It is a further object of the invention to provide a novel apparatus for motion amplification as in the previous object that is capable of being directly attached to the condition responsive element for conjoint floating movement therewith.

It is a further object of the invention to provide a gauge instrument having a novel motion amplifier of substantially less mass and cost than such similar purpose movements of the prior art.

It is a still further object of the invention to provide a gauge instrument as in the last recited object in which the gauge calibration procedure is substantially less complex than previously required for such similar purpose movements of the prior art.

It is yet another object of the invention to provide a gauge instrument with a novel amplifier apparatus enabling temperature compensation increasingly sensitive to environmental conditions than such similar purpose compensation construction previously available.

Figure 1:
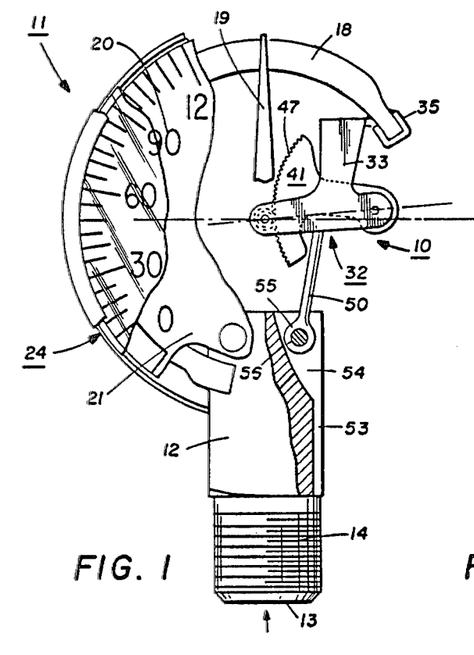
FIGS. 1 and 2 are fragmentary front and end elevations respectively of a pressure gauge embodying the motion amplifier hereof.
Figure 2:
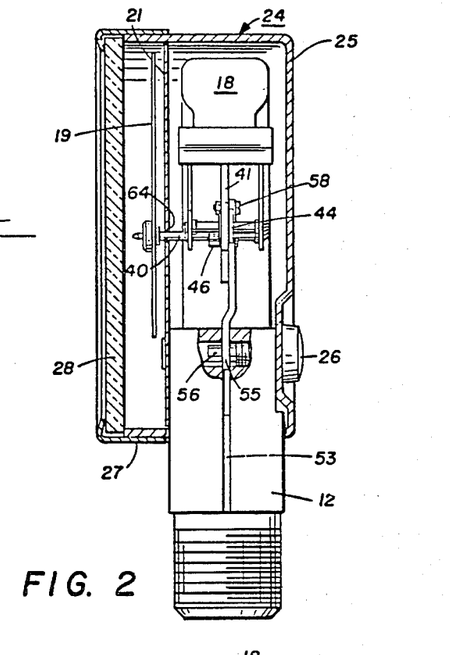

For an understanding of the invention, reference is now made to the drawings and particularly to FIGS. 1 and 2 in which there is illustrated an exemplary use of the amplifier designated 10 in conjunction with an otherwise conventional pressure gauge instrument designated 11. The instrument includes a stem or socket 12 in which fluid pressure to be sensed is received at an inlet 13 and includes threads 14 for connecting the gauge to a system with which it is to be employed. Fluid pressure received at inlet 13 is communicated to a Bourdon tube 18 that is subject to arcuate motion displacement in a well known manner in response to incremental pressure changes received at inlet 13.

The motion of Bourdon tube 18 is conducted to amplifier 10, as will be described below, to produce an amplified and correlated motion for operating a pointer 19 relative to pressure values 20 on dial face 21. Except for stem 12, each of the foregoing components comprise the operating mechanism that is substantially contained within enclosed housing 24. The housing consists of a cup-shaped, shell-like backing 25 secured via screws 26 to stem 12 and a bezel 27 telescopically fit onto backing 25 to secure a crystal 28 for viewing the pointer position relative to dial values 20.

Figure 3:
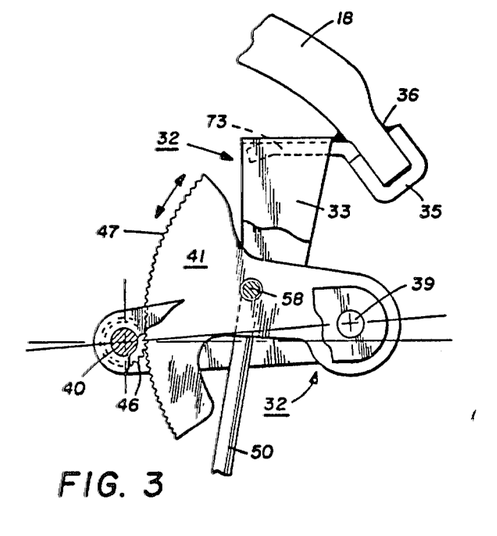
FIGS. 3 and 4 are enlarged front and end views respectively of the motion amplifier.
Figure 4:
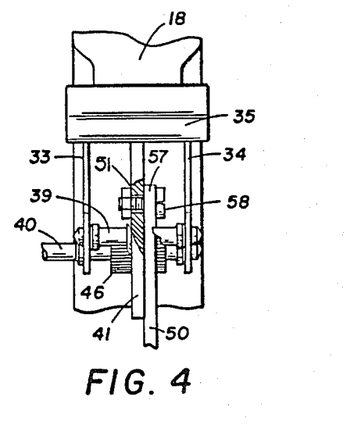
Figure 5:
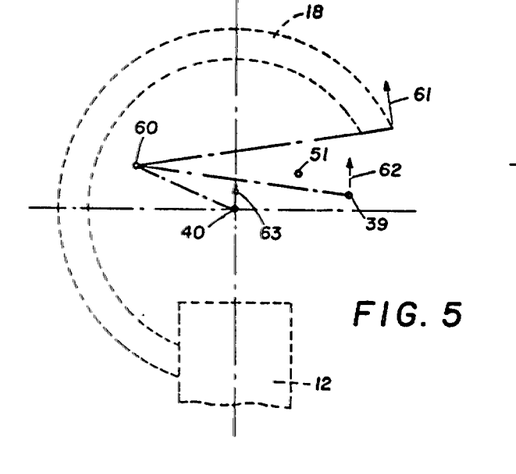
FIG. 5 is a motion diagram for the gauge components of FIG. 1.

With reference also to FIGS. 3, 4 and 5 the amplifier 10 hereof will now be described in a first embodiment as utilized in the pressure gauge of FIGS. 1 and 2. Comprising the amplifier is a centrally upright U-shaped carriage or frame 32 integrally formed to include symetrically spaced apart side legs 33 and 34. Frame 32 is preferably of a hard metal such as brass and of relatively thin cross section to enable slight spreading of its side legs by flexing or bending for reasons as will be understood. Supporting the frame is a tang 73 of an intervening bracket 35 which in turn is U-shaped at its other end for receiving the free end of Bourdon tube 18. Bracket 35 is permanently secured to the Bourdon tube at 36 as by welding, soldering, brazing or the like. Being secured in this arrangement, the carriage and components that it supports are subject to a floating movement conjointly with deflection of Bourdon tube 18 as a result of pressure changes received at inlet 13.

Installed between carriage legs 33 and 34 by spreading the legs as aforesaid, are a pair of longitudinally displaced rotatable shafts 39 and 40. In this manner aligned apertures in the opposite legs provide journalled support for the transverse shafts by a snap-in installation without the need for separate bearings or bearing materials. Shaft 39 provides a hinge support for a geared sector arm 41 secured thereto as by staking at 44 while shaft 40 represents the output drive shaft supporting pointer 19. For purposes of symmetry, the axis of shaft 40 is located to substantially coincide with the central axis of dial plate 21. Rotation of shaft 40 for positioning pointer 19 is effected by a pinion 46 secured thereto and meshing with sector gearing 47 of arm 41. As thus far described all components of the amplifier assembly are secured by bracket 35 to the end of Bourdon tube 18 for conjoint floating movement therewith.

For operating the amplifier there is provided an actuator in the form of a relatively rigid sheet metal pin or link 50 of predetermined fixed length remotely supported and anchored to a suitable location elsewhere about the instrument. As will be understood, actuator 50 can be anchored or secured to any convenient stationary structure about the instrument. In a preferred construction for the embodiment being disclosed there is provided in the wall of stem 12 a vertically slitted recess 53 inwardly dished at 54 to receive the looped end 55 of actuator 50. Supporting that end of the actuator in a pivoting relation is the outboard end 56 of screw 26. Opposite end 57 is likewise looped to receive screw 58 for connecting arm 50 to the sector arm through aperture 51 located intermediate shafts 39 and 40. In this manner, actuator 50 provides a pivot axis for sector arm 41 defined about aperture 51 for reasons as will be understood from the discussion below. In the intended sense, actuator line 50 is not per se a component of amplifier 10 but instead provides the cooperative operating mechanism thereof in response to its floating motion with the free end of Bourdon tube 18.

For an understanding of these operating relationships reference is also made to FIG. 5 in which the arcuate deflection motion of Bourdon tube 18 about its natural pivot axis 60 is represented by arrow 61. The latter motion produces a like motion of amplifier 10 relative to fixed pivot axis 51 affecting shaft 39 as indicated by arrow 62 and affecting shaft 40 as indicated by arrow 63. The travel extent represented by the different arrows 61, 62 and 63 is of course a correlated function of the exact geometric arrangements between the respective components and their relationship to pivot axis 60. At the same time travel 61 is related in a well known manner to the structural properties of condition responsive element 18 and the operational ranges to which it is to be subjected.

Whatever travel extent is incurred by shaft 39, as represented by arrow 62, the effect is to produce a hinged motion of sector arm 41 thereat being pivoted about axis 51 for effecting a first stage amplification of tip motion 61. This in turn results in a second stage amplification comprised of the meshed drive between sector gearing 47 and pinion 46 for operably rotating pointer shaft 40 while the latter is concomitantly displaced from the dial axis to an extent defined by arrow 63. To accommodate axial displacement of shaft 40, dial 21 includes a central aperture 64 of sufficient diametral clearance so as not to interfere with the operation. Since deviation or displacement within aperture 64 is relatively minimal, it is hardly perceptible to the eye except on close inspection and is not objectionable because of its close visual simulation to otherwise conventional prior art operation when viewing the dial from afar. By way of example, for a two inch pressure gauge operationally adapted for pressures from zero to 100 psig, full tip travel of the Bourdon tube is approximately 0.100 inches producing a motion displacement 62 of shaft 39 of about 0.095 inches to in turn produce a motion displacement 63 of shaft 40 of about 0.030 inches equal to about 1/32 inches.

Figure 6:
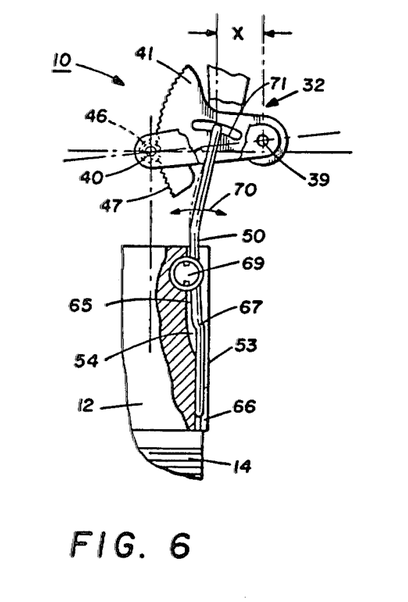
FIGS. 6 and 7 are fragmentary front and end elevations, respectively, of a first optional variation for effecting span adjustment.
Figure 7:
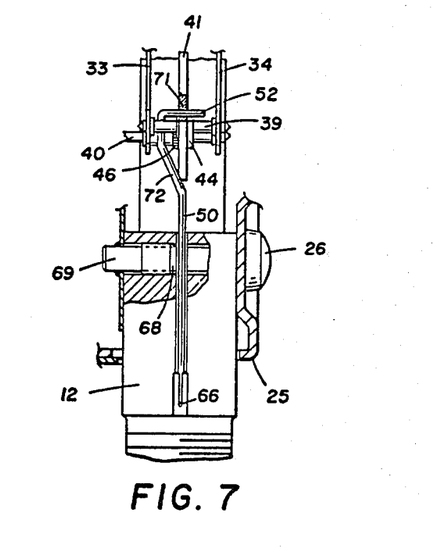

A second amplifier embodiment in the form of a variation from the foregoing will now be described with additional reference to FIGS. 6 and 7 disclosing structure readily enabling "span" adjustment of the instrument. As known in the art, this adjustment is for effecting pointer travel coincident with the dial span encountered by the instrument on being subject to a full range of pressures through which it is intended to operate. For these purposes, actuator 50 extends increasingly downward in stem recess 53 to just above threads 14 where it is securely staked to the stem at 66. Preferably recess 53 throughout its vertical extent is of a width only slightly greater than that of actuator 50 and the latter is offset at 67 to prevent inadvertent sidewise rotation within the recess. From above offset 67, actuator 50 bends inwardly of the dished recess area 54 whereby its side edge 65 bends engagingly against conical nose 68 of a set screw 69 threadably adjustable within stem 12. Vertically beyond that location the actuator extends upwardly to an offset bend or crank 52 received within elongated slot 71 of sector arm 41 for defining the pivot axis therefor. Actuator offset 72 extends in interfering relation to the pivot path of arm 41 for providing an overload stop in the event of an overpressure supplied to the gauge. Similarly tang 73 of bracket 35 acts as an underload stop.

Pivoting leverage is essentially a function of the displacement or span distance represented by the dimension "X" (FIG. 6) between the pivot axis at 52 and the axis of shaft 39. By virtue of actuator 50 being bent in spring-like engagement against conical nose 68, set screw adjustment inwardly or outwardly of the stem causes actuator 50 to be shifted arcuately as represented by arrows 70. Whether shifted right or left, as viewed in FIG. 6, the operating effect of screw 69 is to alter dimension "X" for shifting location of the pivot axis. In this manner the pivot axis can be relocated until span setting for desired accuracy of the instrument is obtained. Reducing dimension "X" has the effect of increasing the amplification ratio and vice versa. The longitudinal shape of slot 71 for these purposes substantially corresponds with the shifting motion path of actuator 50 represented by arrows 70. In this instance slot 71 is arcuate of radius generally corresponding to the actuator length.

A third amplifier embodiment in the form of further variations of the amplifier in order to enable zero adjustment is specifically illustrated in FIGS. 8–11. This adjustment, as is understood in the art, is for obtaining coincident registration between the pointer position and the dial value 20 corresponding to the pressure value to which the instrument is being subjected. In accordance herewith, operating at fifty percent of rated capacity should place pivot axis 52 in a straight line between tube axis 60 and hinge axis 39 in the manner illustrated in FIG. 11. By this means, it is only necessary in accordance with a preferred technique to pressurize the instrument to fifty percent of its operating value at which time pointer 19 should register opposite that corresponding value 20 on dial plate 21.

Figure 8:
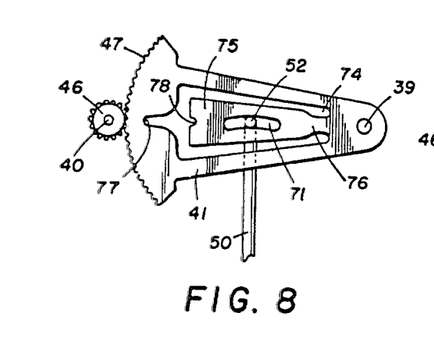
FIGS. 8, 9 and 10 are front elevations of alternative second optional variations for effecting zero adjustment.
Figure 9:
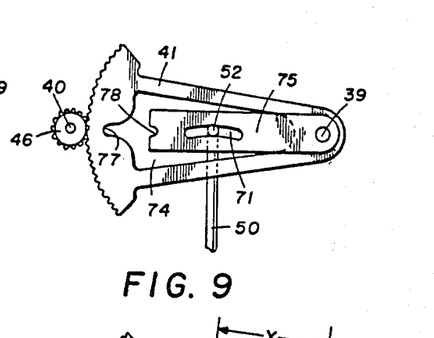
Figure 10:
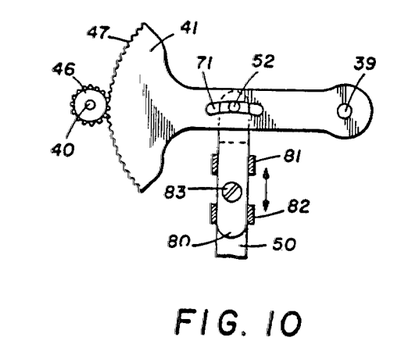
Figure 11:
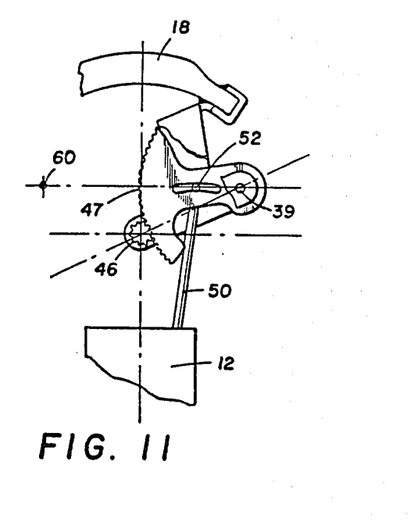
FIG. 11 is a diagrammatic view illustrating a preferred technique for accurately effecting zero adjustment.

To achieve adjustment in the manner of FIG. 8 for effecting the latter correspondence, segment arm 41 includes a cutout 74 containing central cantilevered island portion 75 connected to the main body portion by a thin tang 76. By means of screwdriver slots 77 and 78, insertion of a screwdriver enables rotating central portion 75 about tang 76 until the proper pointer setting is obtained. In FIG. 9 the principle of zero setting is similar except that central portion 75 is commonly secured separately on axis 39, as by a spring load or press fit (not shown). This permits relative angular displacement between 75 and 41 which can be varied by a screwdriver in a manner similar to that previously described. In FIG. 10 the operating length of actuator 50 is directly adjustable. A short length 80 slideable relative to the main body of actuator 50 engages spaced apart guide links 81 and 82 and by means of an eccentric or other suitable type adjustment 83 links 81 and 82 can be moved closer together or further apart as required to effect zero adjustment.

Figure 12:
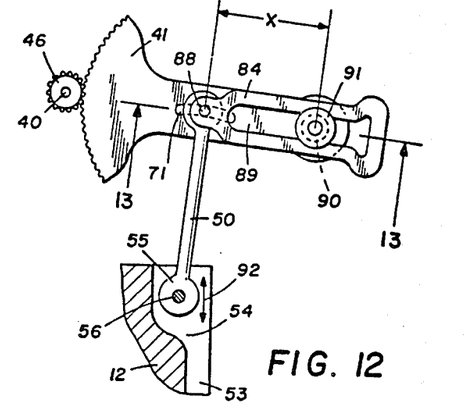
FIG. 12 is a fragmentary view of a combined structure for effecting both span and zero adjustment.
Figure 13:
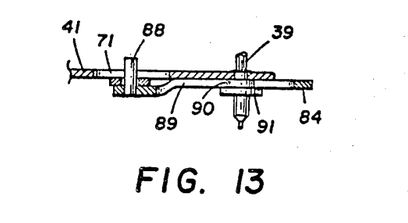
FIG. 13 is a sectional view taken substantially along the lines 13—13 of FIG. 12.

As illustrated in FIGS. 12 and 13 there is disclosed structure enabling dial front setting of the zero adjustment with a factory settable span adjustment. For effecting the latter, there is provided an adjustable segment arm 84 arranged to extend contiguously parallel to sector arm 41. Included at one end of segment arm 84 is a staked pin 88 laterally extending through actuator 50 and sector slot 71 to define the pivot axis for sector arm 41. Centrally longitudinal within segment arm 84 is an elongated slot 89 of generally force fit dimension with respect to an annular hub 90 on hinge shaft 39. A larger outer hub 91 maintains arm 84 closely juxtaposed to arm 41. By forcing arm 84 frictionally in either direction past hub 90 whereby to relocate pin 88 closer or further displaced relative to hinge shaft 39, dimension "X" is varied until proper span adjustment is achieved. To effect zero adjustment actuator 50 is secured to stem 12 in the manner of FIG. 1. However, unlike the previous description thereof, supporting screw end 56 is eccentric relative to its threading axis such that rotation of screw 26 shifts the support of end 55 in the manner of arrow 92. Since screw 26 is accessible from exterior of case 24, on site zero field adjustments can be readily made without disassembly of the unit.

In order to obtain temperature compensation in accordance with further variations hereof, reference is now made to FIGS. 14–18 in which actuator 50 is comprised of a bi-metallic element sensitive to temperature change to which it is exposed. To appreciate the simplicity and yet effectiveness of the structure herein the thermal factors normally affecting gauges of this type should be understood.

These factors are interrelated and generally consist of "thermal balance" and "thermal stress". The former represents a condition which exists when the various operating components are all at the same temperature. Preferably, calibration of the instrument should be conducted under thermally balanced conditions. Thermal stress is generally associated with variations in thermal expansion coefficients between different components. The different temperatures to which the various components are subjected act in the course of temperature change to impose undesirable stresses and changes in setting of the instrument. It should be appreciated that thermal balance is not normally duplicated in industrial use applications for such instruments as all components are rarely at the same operating temperature. For example, the stem is frequently inserted into a pipe well or the like at a substantially different temperature than the ambient environment into which the housing extends for visual reading. Even temperature swings in the ambient environment produce temperature gradients between the inside and outside of the housing that equalize or become eliminated only after an extensive time lag. Consequently, because of these temperature differences and resulting gradients, the operating components are subject to constantly varying thermal stresses which differ throughout the instrument. Most significant of these stresses, from a practical point of view, because of their relative permanency and magnitude, are the temperature differences likely to be imposed in service on stem 12 in contrast to that imposed by the ambient conditions surrounding housing 24. It is not uncommon, for example, on steam applications or the like for stem 12 to be at 200° F. variance with the remainder of the unit to which the stem heat is transmitted by conduction. Moreover, such temperature error is negligible at zero gauge pressure but is known to increase thereafter and become maximum at 100% gauge pressure.

Figures 14, 15, 16, 17, 18:
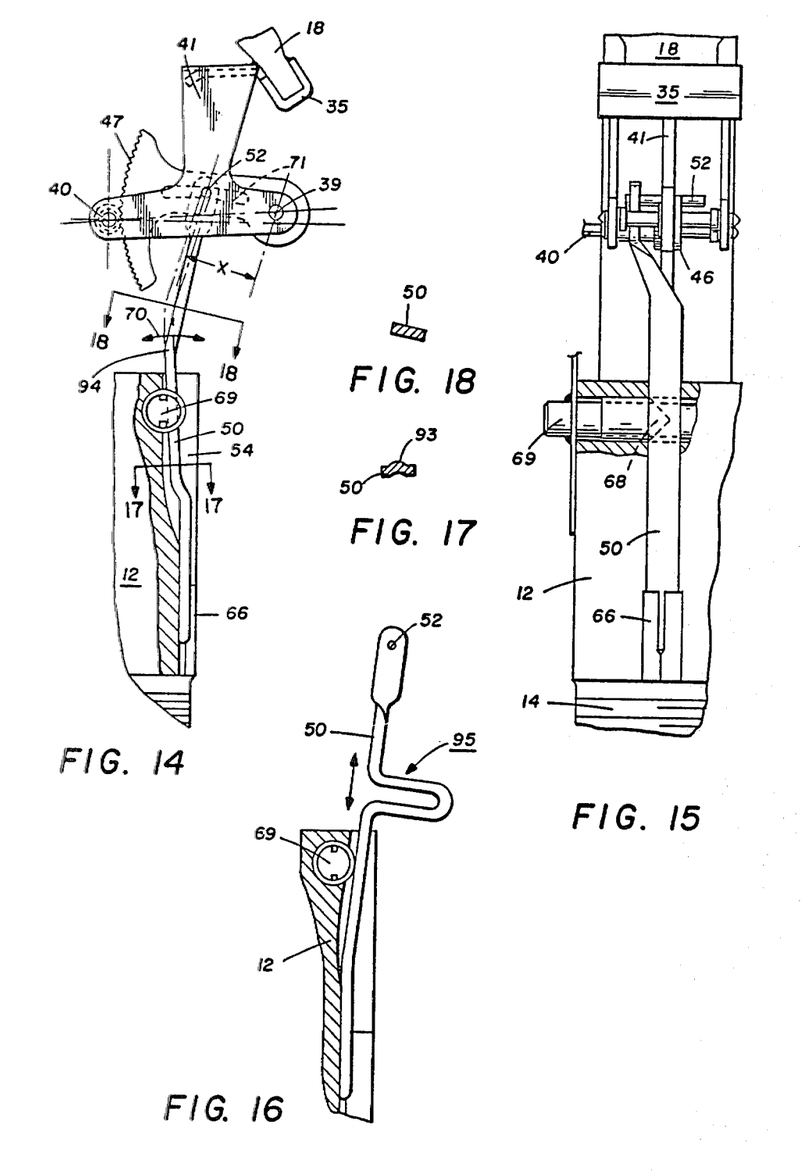
FIGS. 14 and 15 are fragmentary front and end elevations, respectively, of a third optional variation for effecting both temperature compensation and span adjustment.
FIG. 16 is a fragmentary front elevation of a variation to the span and adjustment features of FIGS. 14 and 15 for also enabling zero adjustment.
FIGS. 17 and 18 are sectional views, respectively, taken substantially along the lines 17—17 and 18—18 of FIG. 14.

In accordance herewith, bi-metallic actuator 50 of FIGS. 14-18 is double staked in stem 12 at 66 similarly as described in connection with FIG. 6 affording the actuator a common parallel thermal source with Bourdon tube 18. In order not to affect pointer zero, actuator cross-section generally below offset 94 has a lengthwise ridge 93 (FIG. 17) which renders that longitudinal portion thermally stiff while the upper cross-section, approximately above offset 94, is generally rectangular and flat as shown in FIG. 18 affording it increased thermal activity. With this arrangement, set screw 69 having a tapered seat 68 can be utilized as before for effecting a span adjustment by rotating the actuator in the manner of arrow 70 about its staked portion 66. On the other hand, the upper portion being more thermally active will similarly bend about screw 69 in response to temperature change to which it is subjected to essentially change the span or amplification ratio with temperature. By such changes thermally induced by the actuator, the pivot axis is relocated along a path which is neutral when the gauge and therefore segment slot 71 is at its zero position. In response to a temperature increase, crank pin 52 is displaced away from hinge shaft 39 to increase dimension "X" for effecting amplification reduction and vice versa. When desired to likewise obtain temperature compensated zero adjustment, the construction of FIG. 16 can be employed which includes the added feature of a thermal expansion loop 95. Expansion and contraction of loop 95 in response to temperature change produces an essentially linear movement of the actuator to effect changes in zero setting similarly as hereinbefore described.

With this construction, unlike that of the prior art, the temperature compensator is directly attached to the gauge stem for simultaneous and parallel conduction of temperature changes to the compensator and to the Bourdon tube. Moreover, by virtue of Bourdon tube 18 and the compensator 50 having matched cross sections (thermal resistance) they produce simultaneous motion of arm 41 and pivot 52 in response to temperature changes. Thus, maximum correlation can be obtained in the quickest possible time between thermal effects and thermal compensation sought to be achieved.

Figure 19:
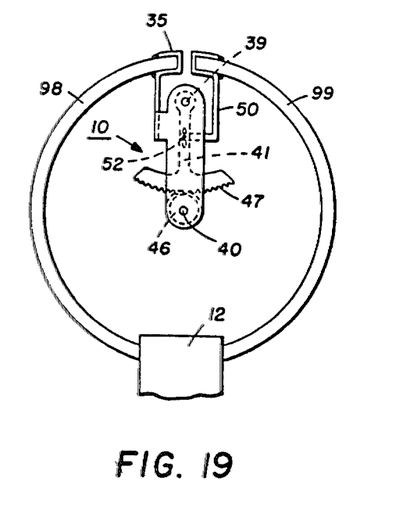
FIGS. 19-22 are partial front elevations of a different embodiment of gauge instruments incorporating the motion amplifier hereof.

Referring now to FIG. 19, there is shown another type of gauge instrument utilizing amplifier 10 hereof. As constructed, the instrument includes two Bourdon tubes 98 and 99 operating as a pressure gauge in which a common pressure is received via stem 12 to produce opposing movement in each of the tubes. This construction can be used, for example, in situations requiring high vibration or shock resistance. Alternatively, the unit can be operated as a differential pressure gauge in which each of the Bourdon tubes are connected to a different source of pressure via separate stems 12. In either event, the amplifier is secured to the movable free end of Bourdon tube 98 with which it is subject to conjoint floating movement similarly as before. Actuator 50 is secured to the free end of Bourdon tube 99 to effectively enjoy conjoint floating movement with the latter whereby relative motion therebetween produces a hinged motion of gear sector 47 about hinge axis 39. Similarly as before, the hinged motion effects pivoting of gear section arm 41 about pivot 52 for driving pinion 46 and pointer shaft 40.

Figures 20, 21, 22, 23, 24:
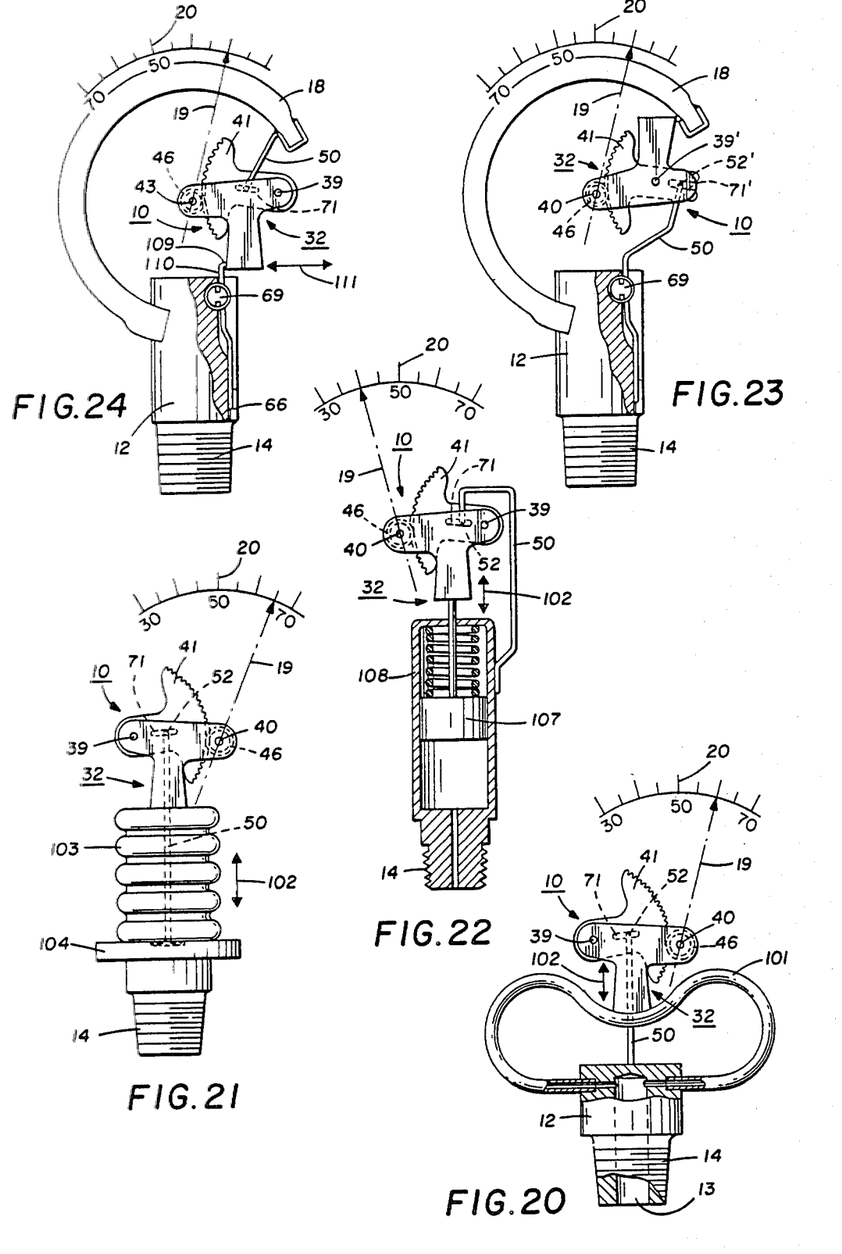
FIG. 23 is a fragmentary front elevation of a modified form of amplifier for the foregoing instrument embodiments.
FIG. 24 is a fragmentary front elevation of an instrument embodiment utilizing the amplifier hereof in its inverted relation.

FIGS. 20–22 represent additional types of gauge instruments utilizing amplifier 10 hereof. In these instrument embodiments, unlike those previously described, their condition responsive elements incur substantial linear rather than arcuate displacement in response to condition changes of their sensitivity. In FIG. 20, amplifier 10 is supported on a triple radius Bourdon tube 101 for substantially linear movement as shown by arrow 102. Tube 101 may, for example, be of a type disclosed in U.S. Pat. No. 2,741,129. The constructions of FIGS. 21 and 22 similarly produce substantially linear movement by means of a bellows 103 secured to a base 104 and a piston 107 operable within a cylinder 108, respectively.

FIG. 23 illustrates a modified form of amplifier 10 in which the location of the hinge shaft and pivot axis of actuator 50 are interchanged with respect to shaft 40 and are here designated 39' and 52', respectively. Axis 52' is displaceable for span adjustment in slot 71' by means of set screw 69 similarly as before. It has been found that this arrangement, in contrast with the prior arrangement, can more readily be used to eliminate sine wave error that might otherwise be encountered in the course of gauge operation.

FIG. 24 represents a still further embodiment in which the support of amplifier 10 and actuator 50 are inverted and interchanged with respect to base 12 and the tip of Bourdon tube 18. In this arrangement, frame 32 of amplifier 10 is secured to the effect termination 109 of a rigid pin or link 110 staked at 66 and laterally displaceable by adjustable set screw 69. By this means, the amplifier rather than the actuator link is displaced in the direction of arrow 111 for effecting span adjustment of the instrument. The virtues and simplicity of this calibration feature are otherwise preserved along the lines previously described. Moreover, by appropriately setting the height of amplifier 10 above stem 12 to match the operating characteristics of tube 18, linearity of the instrument can be readily preset. The latter can be effected by vertical positioning of link 110 as by appropriately setting or adjusting the link height prior to staking at 66.

By the above description there is disclosed a novel amplifier apparatus for gauge instruments resolving a long standing problem with which the industry has been plagued for many years. By virtue of its novel construction, the amplifier not only achieves material cost reduction as compared to such similar purpose amplifiers of the prior art, but it also overcomes the substantial complexities of calibration difficulty and inaccurate temperature compensation characteristically typical of such movements of the prior art. Consequently, the amplifier hereof fulfills a long felt need in providing a construction not previously regarded as possible to substantially simplify an otherwise stagnant construction standardized on by industry for many years. Whereas the invention has been described principally in connection with a Bourdon tube for a pressure gauge construction such description has been utilized only for purposes of disclosure and is not intended as a limitation of the invention. To the contrary, it is to be recognized that the amplifier is capable of use with any condition responsive element producing motion in response to condition changes to which it is sensitive.

Since many changes could be made in the above construction and many apparently widely different embodiments of this invention could be made without departing from the scope thereof, it is intended that all matter contained in the drawings and specifications shall be interpreted as illustrative and not in a limiting sense.

The embodiments of the invention in which an exclusive property or privilege is claimed are defined as follows:

1. A condition responsive gauge instrument comprising:
   (a) a condition responsive element for producing a single output motion in response to condition changes in a pressure source to which it is connected;
   (b) axis means defining a pivot axis; and
   (c) a two stage motion amplifier means operably supported on said condition responsive element for floating conjoint movement therewith; said motion amplifier means cooperatively interacting in its motion path with said axis means to produce an output motion correlated to the condition change motion incurred by said condition responsive element;
   (d) said amplifier means being adapted to receive its input from the produced motion of said condition responsive element whereby the first of said stages produces a multiplied output of the input received from said condition responsive element and the second stage produces a multiplied output of an input received from the output of the first stage.

2. A gauge instrument according to claim 1 including calibration means enabling calibrating the operation of said amplifier means relative to the operative motion of said condition responsive element.

3. A gauge instrument according to claim 1 in which said condition responsive element comprises a Bourdon tube.

4. A condition responsive gauge instrument comprising in combination:
   (a) a condition responsive element for producing motion in response to condition changes to which it is sensitive;
   (b) axis means defining a stationary pivot axis; and
   (c) motion amplifier means operably supported on said condition responsive element for floating conjoint movement therewith; said motion amplifier means cooperatively interacting in its motion path with said axis means and effecting at least two stage amplification in producing an output motion correlated to the condition change motion incurred by said condition responsive element and including:
      (1) a support frame secured to said condition responsive element;
      (2) pivot means hinge connected to said support frame to operably interact with said axis means, said pivot means being adapted at its connection for hinged motion relative thereto to incur pivotal motion about said axis means in effecting one of said amplification stages; and
      (3) a rotatable output shaft mounted on said support frame to be rotatably driven by said pivot means in response to its incurred pivotal motion about said axis means in effecting another of said amplification stages.

5. A gauge instrument according to claim 4 including calibration means enabling calibrating the operation of said amplifier means relative to the operative motion of said condition responsive element.

6. A gauge instrument according to claim 2 in which said axis means comprises an actuator remotely anchored and connected to said pivot means at a predetermined location displaced from said hinge connection.

7. A gauge instrument according to claim 6 in which said calibration means includes means to presettably adjust the ratio of the amplifier means output motion relative to the operative motion of said condition responsive element.

8. A gauge instrument according to claim 7 in which said calibration means also includes means to presettably adjust said amplifier means to effect the zero position setting of said condition responsive element.

9. A gauge instrument according to claim 8 in which said ratio adjustment means and said zero position adjustment means are operable mutually independent of each other.

10. A condition responsive gauge instrument comprising in combination:
    (a) a first Bourdon tube for producing a first motion in response to condition changes to which it is sensitive;
    (b) a second Bourdon tube for producing a second motion in response to condition changes to which it is sensitive;
    (c) axis means defining a pivot axis and supported extending from a support position on said first Bourdon tube, said axis means being movable conjointly with the movement of said first Bourdon tube for changing the location of said defined pivot axis in correlation therewith; and (d) a two stage motion amplifier means operably supported on said second Bourdon tube for floating conjoint movement therewith; said motion amplifier means cooperatively interacting in its motion path with said axis means to produce an output motion correlated to the combined condition change motions incurred by both of said Bourdon tubes, and including:

(1) a support frame secured to said second Bourdon tube;

(2) pivot means hinge connected to said support frame to operably interact with sais axis means, said pivot means being adapted at its connection for hinged motion relative thereto to incur pivotal motion about said axis means; and (3) a rotatable output shaft mounted on said support frame to be rotatably driven by said pivot means in response to its incurred pivotal motion about said axis means.

11. A gauge instrument according to claim 4 in which said axis means comprises an actuator remotely anchored and connected to said pivot means at a predetermined location displaced from said hinge connection.

12. A gauge instrument according to claim 11 in which said actuator comprises an elongated element relatively rigid in a longitudinal direction and relatively flexible in a lateral direction.

13. A gauge instrument according to claim 12 in which the drive output of said pivot means comprises a first gear element and said output shaft supports a second gear element secured thereto and operatively meshing with said first gear element.

14. A gauge instrument according to claim 13 including a dial member for cooperatively affording a visual readout of condition values to which the instrument is operatively responding and said output shaft is axially located substantially axially coincident with the optical axis of said dial.

15. A gauge instrument according to claim 14 including a pointer secured to said output shaft visually opposite said dial for angular displacement by said shaft relative thereto.

16. A gauge instrument according to claim 12 including calibration means enabling calibrating the operation of said amplifier means relative to the operative motion of said condition responsive element.

17. A gauge instrument according to claim 16 in which said calibration means includes means to presettably adjust the ratio of the amplifier means output motion relative to the operative motion of said condition responsive element.

18. A gauge instrument according to claim 17 in which said calibration means also includes means to presettably adjust said amplifier means to effect the zero position setting of said condition responsive element.

19. A gauge instrument according to claim 18 in which said ratio adjustment means and said zero position adjustment means are operably settable mutually independent of each other.

20. A gauge instrument according to claim 18 in which said zero position adjustment means comprises means for shifting said defined pivot axis relative to the output drive of said pivot means in a plane generally parallel thereto.

21. A gauge instrument according to claim 17 in which said ratio adjustment means comprises means engaging said actuator at a location intermediate its length and operatively adapted to effect displacement thereof for laterally shifting said defined pivot axis relative to the hinge axis connection of said pivot means.

22. A gauge instrument according to claim 4 in which said pivot means is weighted in an unbalanced relation about its hinge connection operatively urging a weighted turning moment thereabout.

23. A condition responsive gauge instrument comprising in combination:

(a) a condition responsive element producing motion in response to condition changes to which it is sensitive;

(b) axis means defining a pivot axis;

(c) motion amplifier means operably supported on said condition responsive element for floating conjoint movement therewith; said motion amplifier means cooperatively interacting in its motion path with said axis means and effecting at least two stage amplification in producing an output motion correlated to the condition change motion incurred by said condition responsive element; and (d) temperature compensator means for effecting an operative relation between said condition responsive element and said amplifier means compensated in at least partial correlation to temperature differentials incurred by components of said instrument.

24. A gauge instrument according to claim 22 in which said temperature compensator means and said condition responsive element are mutually connected to a common thermal source for thermally parallel sensitivity in response to temperature changes of said source.

25. A gauge instrument according to claim 23 in which said temperature compensator means comprises said axis means at least partially formed of temperature sensitive bi-metallic elements acting to relocate said defined pivot axis in response to temperature changes to which it is subjected.

26. A gauge instrument according to claim 24 in which said condition responsive element comprises a Bourdon tube and a pressure supply stem adapted for connection to a pressure source to which the instrument is to be responsive comprises said common thermal source.

27. A condition responsive gauge instrument comprising in combination:

(a) a condition responsive element for producing motion in response to condition changes to which it is sensitive;

(b) axis means comprising an anchored actuator defining a pivot axis;

(c) motion amplifier means operably supported on said condition responsive element for floating conjoint movement therewith; said motion amplifier means cooperatively interacting in its motion path with said axis means and effecting at least two stage amplification in producing an output motion correlated to the condition change motion incurred by said condition responsive element and including:

(1) a support frame secured to said condition responsive element;

(2) pivot means hinge connected to said support frame and pivottally connected to said actuator at a predetermined location displaced from said hinge connection to operably interact therewith, and pivot means being adapted at its connection for hinged motion relative thereto to incur pivotal motion about said pivot axis in effecting one of said amplification stages;

(3) a rotatable output shaft mounted on said support frame to be rotatably driven by said pivot means in response to its incurred pivotal motion about said pivot axis in effecting another of said amplification stages; and (4) calibration means enabling calibrating the operation of said amplifier means relative to the operative motion of said condition responsive element, said calibration means including means to presettably adjust the ratio of the amplifier means output motion relative to the operative motion of said condition responsive element and means to presettably adjust said amplifier means to effect the zero position setting of said condition responsive element, said ratio adjustment means and said zero position adjustment means being operable mutually independent of each other; and (d) temperature compensator means for effecting an operative relation between said condition responsive element and said amplifier means compensated in at least partial correlation to temperature differentials incurred by components of said instrument.

28. A gauge instrument according to claim 27 in which said temperature compensator means and said condition responsive element are mutually connected to a common thermal source for thermally parallel sensitivity in response to temperature changes of said source.

29. A gauge instrument according to claim 28 in which said temperature compensator means comprises said means at least partially formed of temperature sensitive bi-metallic elements acting to relocate said defined pivot axis in response to temperature changes to which it is subjected.

30. A gauge instrument according to claim 29 in which said condition responsive element comprises a Bourdon tube and a pressure supply stem adapted for connection to a pressure source to which the instrument is to be responsive comprises said common thermal source.

31. A motion amplifier for a gauge instrument having a motion producing condition responsive element, said amplifier comprising in combination;

(a) a support frame;

(b) output means affording at least two stage motion amplification of said condition responsive element, said output means being hinge mounted on said support frame for hinge motion relative thereof and including means to receive an actuator defining a stationary pivot axis displaced from the axis of said hinge mount to cooperatively effect a pivotal output motion thereabout in response to its hinge motion incurred relative to said frame; and (c) mounting means adapted for mounting said support frame and said output means as a unit operably supported on the condition responsive element for floating conjoint motion therewith to produce the hinge and pivotal motion of said output means.

32. A motion amplifier according to claim 31 in which the received actuator is remotely anchored.

33. A motion amplifier for a gauge instrument having a motion producing condition responsive element, said amplifier comprising in combination:

(a) a support frame;

(b) pivot means hinge connected to said support frame and adapted at its connection for hinged motion relative thereto; said pivot means including means to receive a remotely supported actuator connected thereto at a predetermined location displaced from said hinge connection to define a stationary pivot axis thereat;

(c) output means mounted on said support frame to be operably driven by pivotting of said pivot means about said defined pivot axis in response to hinged motion thereof; and (d) mounting means secured to said frame and adapted for mounting said support frame, said pivot means and said output means as a unit operably supported on a movable section of the condition responsive element for floating conjoint movement therewith and affording at least two stage amplified output motion in response to condition changes to which the element is sensitive.

34. A motion amplifier according to claim 33 in which said output means comprises a rotatable shaft.

35. A motion amplifier according to claim 33 including calibration means for enabling calibrated operation of the amplifier relative to operation of the condition responsive element on which it is to be mounted.

36. A motion amplifier according to claim 35 in which said calibration means includes means to relatively shift said predetermined location of said defined pivot axis at which to receive the actuator.

37. A motion amplifier according to claim 33 in which said pivot means is weighted in an unbalanced relation about its hinge connection operatively urging a weighted turning moment thereabout.

38. In a motion amplifier for a gauge instrument having a displacement producing condition responsive element in which said amplifier includes input means adapted for connection to said condition responsive element for operable displacement therewith and output means operably coacting with said input means for effecting an output displacement correlated to the input displacement incurred by said input means, the improvement in said amplifier comprising in combination:

(a) an integral support frame of substantially unitary composition and generally U-shaped in transverse section including generally parallel side legs laterally bridged together at their common ends and relatively spreadable at their free ends; and (b) first and second spaced apart rotatable shafts each transversely extending between said side legs and supported in a snap-in relation directly journalled therein;

(c) one of said shafts providing rotatable support for said input means and the other of said shafts providing rotatable support for said output means.

39. The improvement according to claim 38 in which said shafts are retained in their journalled relation by the lateral yield properties of said frame legs.

40. The improvement according to claim 39 in which said amplifier frame is adapted to be supported in said gauge instrument on a stationary portion thereof.

41. The improvement according to claim 40 in which said input means includes means to receive an actuator supported from the displacement producing condition responsive element of said gauge instrument for defining a pivot axis therein displaced from the input means support shaft.

42. The improvement according to claim 41 in which there is included adjustable support means to displace said amplifier relative to the defined pivot axis for effecting span adjustment of said amplifier.

43. The improvement according to claim 39 in which said amplifier frame is adapted to be supported in said gauge instrument on the displacement producing condition responsive element thereof.

44. The improvement according to claim 43 in which said input means includes means to receive an actuator supported from a stationary portion of said gauge instrument for defining a pivot axis therein displaced from the input means support shaft.

45. A condition responsive gauge instrument comprising in combination:
 (a) a condition responsive element for producing motion in response to condition changes to which it is sensitive;
 (b) elongated axis means extending stationary between first and second ends with the first of said ends being fixed to a stationary portion of the instrument; and
 (c) motion amplifier means operably supported on said condition responsive element for floating conjoint movement therewith and having an aperture for receiving the second end of said axis means;
 (d) said second end of said axis means being stationary in said aperture and cooperatively interacting with said motion amplifier means in its motion path for said amplifier means to effect angular amplification in producing an output motion correlated to the condition change motion incurred by said condition responsive element.

46. A gauge instrument according to claim 45 in which said motion amplifier means includes:
 (a) a support frame secured to said condition responsive element; and
 (b) output means hinge mounted onto said support frame and adapted for hinged motion relative thereto, said output means being operably engaged with said axis means to cooperatively effect a pivotal output motion thereabout in response to hinged motion incurred relative to said frame.

47. A condition responsive gauge instrument comprising in combination:
 (a) a condition responsive element for producing motion in response to condition changes to which it is sensitive;
 (b) axis means defining a stationary pivot axis; and
 (c) motion amplifier means operably supported on said condition responsive element for floating conjoint movement therewith; said motion amplifier means cooperatively interacting in its motion path with said axis means and effecting angular amplification in producing an output motion correlated to the condition change motion incurred by said condition responsive element and including:
  (1) a support frame secured to said condition responsive element;
  (2) pivot means hinge connected to said support frame to operably interact with said axis means, said pivot means being adapted at its connection for hinged motion relative thereto to incur pivotal motion about said axis means; and
  (3) a rotatable output shaft mounted on said support frame to be rotatably driven by said pivot means in response to its incurred pivotal motion about said axis means.

48. A gauge instrument according to claim 47 in which said axis means comprises an actuator remotely anchored and connected to said pivot means at a predetermined location displaced from said hinge connection.

49. A condition responsive gauge instrument comprising in combination:
 (a) a condition responsive element for producing motion in response to condition changes to which it is sensitive;
 (b) axis means defining a stationary pivot axis; and
 (c) motion amplifier means operably supported on said condition responsive element for floating conjoint movement therewith; said motion amplifier means cooperatively interacting in its motion path with said axis means and effecting at least two stage amplification in producing an output motion correlated to the condition change motion incurred by said condition responsive element and including:
  (1) a support frame secured to said condition responsive element; and
  (2) output means hinge mounted onto said support frame and adapted for hinged motion relative thereto, said output means being operably engaged with said axis means to cooperatively effect a pivotal output motion thereabout in response to hinged motion incurred relative to said frame.

50. A gauge instrument according to claim 49 including calibration means enabling calibrating the operation of said amplifier means relative to the operative motion of said condition responsive element.

51. A gauge instrument according to claim 16 or 50 in which said calibration means includes span adjustment means operatively settable from a stationary location on the instrument.

52. A gauge instrument according to claim 51 in which said calibration means also includes zero adjustment means operatively settable from a stationary location on the instrument.

53. A condition responsive gauge instrument comprising in combination:
 (a) a condition responsive element for producing motion in response to condition changes to which it is sensitive;
 (b) elongated axis means extending stationary between first and second ends with the first of said ends being fixed to a stationary portion of the instrument; and
 (c) motion amplifier means operably supported on said condition responsive element for floating conjoint movement therewith and having an aperture for receiving the second end of said axis means;
 (d) said second end of said axis means being stationary in said aperture and cooperatively interacting with said motion amplifier means in its motion path for said amplifier means to effect at least two stage amplification in producing an output motion correlated to the condition change motion incurred by said condition responsive element.

54. A condition responsive gauge instrument comprising in combination:
 (a) a condition responsive element for producing motion in response to condition changes to which it is sensitive;
 (b) elongated axis means extending stationary between first and second ends with the first of said ends being fixed to a stationary portion of the instrument; and
 (c) motion amplifier means operably supported on said condition responsive element for floating conjoint movement therewith and having an aperture for receiving the second end of said axis means;
 (d) said second end of said axis means being stationary in said aperture and cooperatively interacting with said motion amplifier means in its motion path for said amplifier means to produce an output motion correlated to the condition change motion incurred by said condition responsive element.

* * * * *

UNITED STATES PATENT AND TRADEMARK OFFICE
CERTIFICATE OF CORRECTION

PATENT NO. : 4,240,298
DATED : December 23, 1980
INVENTOR(S) : Richard H. Wetterhorn It is certified that error appears in the above-identified patent and that said Letters Patent are hereby corrected as shown below:

Col. 2, line 48, change "culative" to -- relative --.

Col. 10, line 40, change the dependency of claim 6 from "2" to --5--;

Col. 11, line 14, change "sais" to --said--;

Col. 12, line 28, change the dependency of claim 24 from "22" to --23--;

Col. 12, line 34, change the dependency of claim 25 from "23" to --24--;

Col. 12, line 40, change the dependency of claim 26 from "24" to --25--;

Col. 12, line 67, delete "and" and substitute --said--;

UNITED STATES PATENT AND TRADEMARK OFFICE
CERTIFICATE OF CORRECTION

PATENT NO. : 4,240,298

DATED : December 23, 1980

INVENTOR(S) : Richard H. Wetterhorn

It is certified that error appears in the above—identified patent and that said Letters Patent is hereby corrected as shown below:

Col. 13, line 33, after "said" insert -- axis --.

Col. 13, line 50, change "thereof" to -- thereto --.

Signed and Sealed this

Twelfth Day of May 1981

[SEAL]

*Attest:*

RENE D. TEGTMEYER

*Attesting Officer*     *Acting Commissioner of Patents and Trademarks*